(12) United States Patent
Stonehocker et al.

(10) Patent No.: US 7,899,818 B2
(45) Date of Patent: Mar. 1, 2011

(54) METHOD AND SYSTEM FOR PROVIDING FOCUSED SEARCH RESULTS BY EXCLUDING CATEGORIES

(75) Inventors: Timothy P. Stonehocker, Palo Alto, CA (US); Su-Lin Wu, San Carlos, CA (US)

(73) Assignee: A9.Com, Inc., Palo Alto, CA (US)

( * ) Notice: Subject to any disclaimer, the term of this patent is extended or adjusted under 35 U.S.C. 154(b) by 270 days.

(21) Appl. No.: 11/392,211

(22) Filed: Mar. 29, 2006

(65) Prior Publication Data

US 2007/0239676 A1  Oct. 11, 2007

(51) Int. Cl.
G06F 17/00 (2006.01)
G06F 17/30 (2006.01)
G06F 3/048 (2006.01)

(52) U.S. Cl. .................. 707/731; 715/780; 715/859; 715/860

(58) Field of Classification Search ............ 707/3
See application file for complete search history.

(56) References Cited

U.S. PATENT DOCUMENTS

| | | | | |
|---|---|---|---|---|
| 4,972,349 A | * | 11/1990 | Kleinberger | 707/1 |
| 6,006,225 A | * | 12/1999 | Bowman et al. | 707/5 |
| 6,487,553 B1 | * | 11/2002 | Emens et al. | 707/5 |
| 2002/0194166 A1 | | 12/2002 | Fowler | |
| 2005/0240557 A1 | * | 10/2005 | Rorex et al. | 707/1 |
| 2007/0005576 A1 | * | 1/2007 | Cutrell et al. | 707/3 |

OTHER PUBLICATIONS

The Free On-Line Dictionary of Computing, HTML, Apr. 9, 1997, Available: http://foldoc.org [Accessed: Nov. 11, 2008].*
International Search Report mailed on Jul. 3, 2008, for International Application No. PCT/US07/65513 filed on Mar. 29, 2007, 1 page.
Supplementary European Search Report mailed on Dec. 23, 2009, for EP Application No. 07759705.2 filed on Mar. 29, 2007, 3 pages.

* cited by examiner

*Primary Examiner*—Pierre M Vital
*Assistant Examiner*—Jason Liao
(74) *Attorney, Agent, or Firm*—Kilpatrick Townsend and Stockton LLP

(57) ABSTRACT

A method of providing search results includes performing a search in response to a search request, providing a first list of results responsive to the search request, providing a list of selectable terms based on content included in the first list of results, receiving a user-selected term from the list of selectable terms, and providing a second list of results. The second list of results excludes results having content related to the user-selected term.

28 Claims, 6 Drawing Sheets

METHOD AND SYSTEM FOR PROVIDING FOCUSED SEARCH RESULTS BY EXCLUDING CATEGORIES

BACKGROUND

A user desiring to access information available over a network such as the Internet may typically begin the process by entering one or more search terms, such as keywords, in a search engine available at a search engine website. The search engine uses the keywords to generate a listing of search results, usually in the form of one or more search results web pages, where each search result may be associated with a web site or web page content relevant to or otherwise associated with the keywords. For example, if a visitor to a search engine website enters the term "flowers," web pages that may be relevant to flowers may be listed on the search results page.

The search results listing is often quite large and may include multiple pages of search results where each page includes some portion of the search results. For example, a first web page may be used to display the first ten search results, a second web page may be used to display the second ten search results, etc. Because of the large number of search results, and the correspondingly large number of pages displaying those search results, a user may have difficulty finding websites of interest to the user, particularly if the relevant website is displayed on a fourth, fifth, or even later page of search results.

In order to assist users in reviewing the search results listing, search engines often use an automated ranking algorithm to rank the search results based on relevancy. The relevance of each search result is generally determined based on a number of factors, including the content or subject matter of the web page, the number of other web pages having links to that web page, etc. However, determining the relevancy of a particular web page to a keyword search is an inherently difficult task, and in some situations, the automated ranking algorithm may not be effective in directing the user to the web pages containing the desired information.

For example, if a user enters a search term that is widely used in a variety of unrelated general contexts, (e.g., the term "eagle" may generally refer to the bird, as well as to one or more otherwise unrelated products, persons, sports teams or other organizations adopting the name "Eagle"), several unrelated yet highly or even equally relevant web pages may be identified by the search engine. Moreover, even if the user enters a search term that is typically used in a single general context (e.g., San Francisco typically refers to the city in general), several unrelated yet highly or even equally relevant web pages may be identified by the search engine within that context (e.g., web pages related to one more locations or entities within San Francisco). In these situations, the user may be faced with having to navigate through a large number of unrelated web page listings to find those search results that are the most relevant. It would be beneficial to provide a method and system for providing search results that enables a user to more efficiently navigate through a search results listing, eliminate less relevant search results, and perform a more focused search.

SUMMARY

One embodiment relates to a method of providing search results. The method includes performing a search in response to a search request, providing a first list of results responsive to the search request, providing a list of selectable terms based on content included in the first list of results, receiving a user-selected term from the list of selectable terms, and providing a second list of results. The second list of results excludes results having content related to the user-selected term.

Another embodiment relates to a system for providing search results. The system includes a search engine configured to perform a search based on a keyword and to retrieve content included in results associated with the keyword. The system also includes a search results analysis engine configured to provide a first list of results associated with the keyword based on the search, to provide a list of selectable terms based on the content included in the web pages in the first list of results, to receive a user-selected term from the list of selectable terms, and to provide a second list of results. The second list of results excludes results having content related to the user-selected term.

Another embodiment relates to a graphical user interface. The graphical user interface includes memory including program logic configured to generate a first display screen. The first display screen includes a first list of results associated with a keyword based on a keyword search and a list of selectable terms based on content included in the first list of results. The first display screen is configured to receive a user-selected term from the list of selectable terms. The program logic is also configured to generate a second display screen in response to receiving the user-selected term from the list of selectable terms. The second display screen includes a second list of results. The second list of results excludes results from the first list of results having content related to the user-selected term.

Another embodiment relates to a method of providing search results. The method includes receiving a keyword as part of a search request from a user computer, performing a search based on the keyword using a search engine, retrieving content of results of the search including the keyword, determining a first list of results including the keyword in the retrieved content, providing a list of selectable terms based on the content retrieved for the results in the first list of results, receiving a user-selected term from the list of selectable terms, and providing a second list of results. The second list of results includes results having content excluding the first user-selected term.

Another embodiment relates to a graphical user interface. The graphical user interface includes memory including program logic configured to generated a search results screen. The search results screen includes a list of search results associated with a keyword based on a keyword search. The search results in the list of search results are ranked based on relevance to the keyword. The search results screen also includes a search results index configured to facilitate listing the search results based on terms included in content associated with each of the search results. The search results screen is configured to receive a user-selected term from the search results index.

DETAILED DESCRIPTION OF EXEMPLARY EMBODIMENTS

Figure 1:
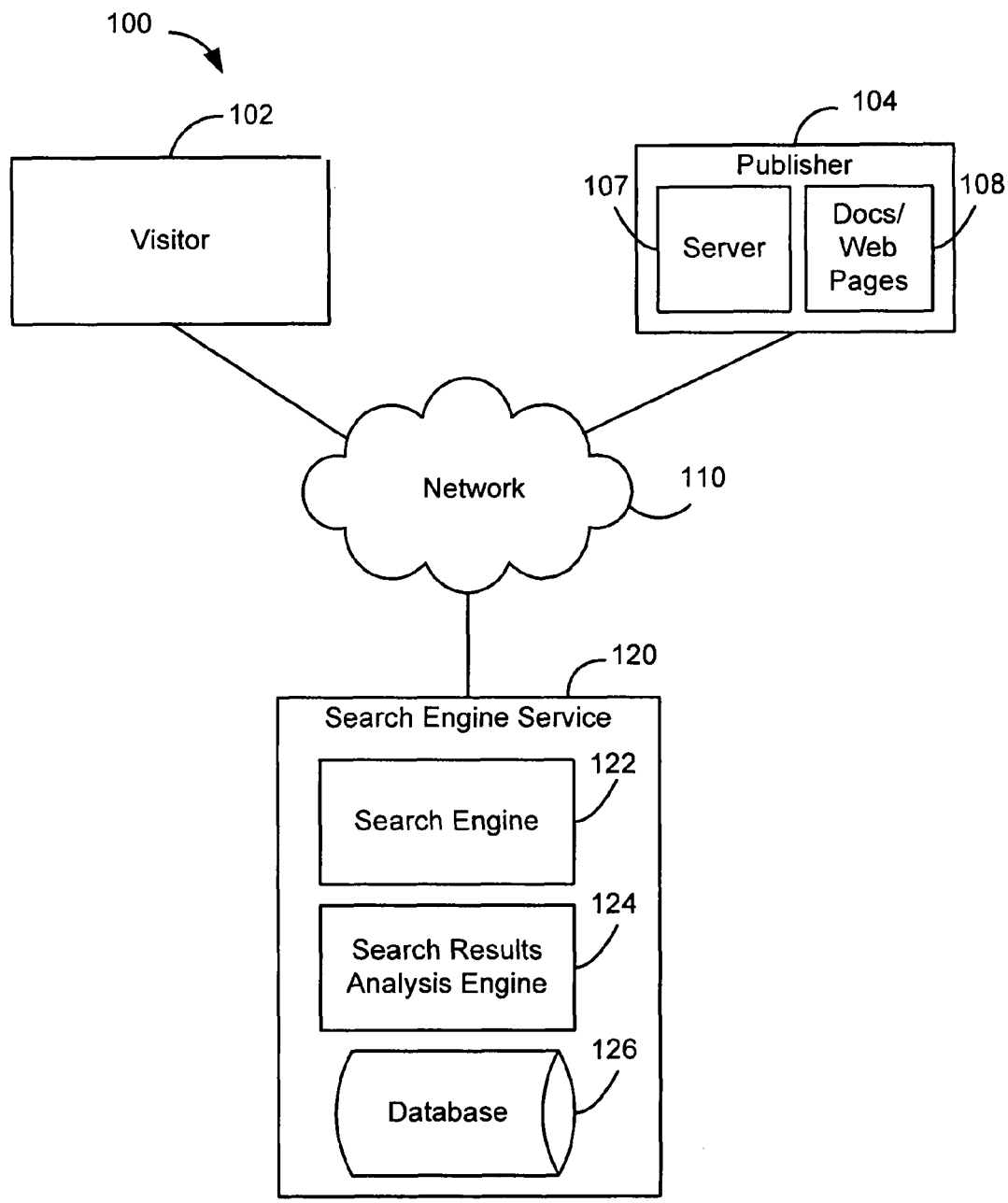
FIG. 1 is a block diagram that schematically illustrates a system for providing focused search results according to an exemplary embodiment.

FIG. 1 illustrates a system 100 for providing focused search results according to an exemplary embodiment. System 100 may include one or more visitors 102 and one or more publishers 104. Visitors 102 and publishers 104 may each include one or more computers (e.g., a server, personal computer, laptop, workstation, web-enabled phone, web-enabled e-mail device, PDA, etc.) which are connected to each other by way of a communication network 110, such as the Internet. System 100 also includes a search engine service 120. System 100 is generally configured to allow visitors 102 to view content made available by publishers 104 (e.g., a website including web server 107 and associated web pages or other documents 108 that are generated from a repository of HTML or other content and templates) via communication network 110.

In particular, system 100 is configured to provide focused search results to a visitor 102 in response to a search request from visitor 102. For example, visitor 102 may submit a search term, such as a keyword, to system 100. The keyword may be a term widely used in a variety of unrelated general contexts, or a term that is typically used in a single general context, but having several unrelated topics within that context. System 100 is configured to enable visitor 102 to more efficiently navigate through a large number of search results, many of which may be unrelated to each other or less relevant than others. System 100 is configured to provide visitor 102 with a list of terms that may be used as, for example, a search results map, index, or table of contents to enable visitor 102 to eliminate less relevant search results and perform a more focused search to identify the more relevant results.

Search engine service 120 may include a search engine 122, a search results analysis engine 124, and a database 126. According to other exemplary embodiments, one or more of these components may be provided as separate entities. For example, search results analysis engine 124 and a database 126 may be integrated and search engine 120 may be provided by a separate entity, such that search results analysis engine 124 and a database 126 are provided as an application programming interface (API). It should also be understood that, while many of the embodiments are described herein in the context of searching web pages over a network such as the Internet, other types of searchable content and systems are contemplated as well. For example, according to an exemplary embodiment, search engine service 120 may be configured to search any type of electronic material. In this embodiment, search engine service 120 may be provided as part of an API to enable searching any type of electronic material over a communication network. According to another exemplary embodiment, search engine service 120 may be provided as part of an API to enable local searching for electronic documents within a single system.

Search engine 122 may be any program configured to retrieve data, files, or documents from a database or network, such as the Internet, based on search terms, such as keywords, entered by a visitor 102 or other users (e.g., user of a search engine website). According to an exemplary embodiment, search engine 122 may be a general search engine configured to search for and retrieve documents from the Internet based on keywords submitted by a visitor 102. In this embodiment, search engine 122 may be used by visitors for searching the websites of several different publishers 104, which may provide individual web pages or other documents 108 containing content for a wide variety of subjects. When search engine 122 is provided with one or more keywords submitted by a visitor 102, the results of the search may be provided by search engine 122 in the form of data, such as data for one or more search results lists. The search results list may be, for example, a search results web page, which may include a listing of websites and/or content-based web pages or other documents 108 relevant to or associated with the keywords. The term "search result" as used herein refers to an individual listing of a website, web page, or other document contained in a search results list. Search engine 122 may also be configured to retrieve and provide data including excerpts of content from individual web pages or other documents 108 as part of the search results list. According to another exemplary embodiment, search engine 122 may be a product search engine associated with a website of a publisher 104 and configured to search for and retrieve documents related to various products or services.

Search results analysis engine 124 is in communication with search engine 122 and may be generally configured to work in conjunction with search engine 122 to provide focused search results to a visitor 102 in response to a search request from visitor 102. More particularly, search results analysis engine 124 may be configured to receive one or more keywords as part of a search request from a visitor 102, and to provide a list of search results associated with the keyword based on search results data from search engine 122. For example, search results analysis engine 124 may receive the keyword "tiger" from a visitor 102. In response, search results analysis engine 124 may provide a list of search results associated with the keyword "tiger."

The search results list may present the search results in the form of for example, a list of hyperlinks or other selectable objects, where each hyperlink provides access to a particular search result. Each search result may be listed according to a ranking based on the relevancy of each search result to the submitted keyword. For example, the search results list may present the search results in order from most relevant to least relevant. According to various exemplary embodiments, the relevance of each search result may be determined using any suitable format or scale, as well as using any number of criteria for determining relevance. The search results list may also include excerpts of content retrieved by search engine 122 for each search result.

Search results analysis engine 124 may be configured to request a predetermined number of search results from search engine 122 upon receipt of a search request including a keyword from a visitor 102, as well as to request the searchable content portions of each of the search results. According to an exemplary embodiment, search results analysis engine may be configured to request approximately one hundred search results from search engine 122 ranked according to relevance to a keyword submitted by a visitor 102, and also to request the searchable content for each of the 100 results, which may be stored in database 126 for analysis.

Search results analysis engine 124 may also be configured to provide a list of selectable terms with the search results list. The list of selectable terms may be based on an analysis of the searchable content received from search engine 122 for each of the search results to identify terms that may be useful in grouping or otherwise determining useful relationships among the search results. According to an exemplary embodiment, search results analysis engine 124 is configured to analyze the searchable content received from search engine 122 for each of the search results to identify one or more terms based on such exemplary factors as frequency of use, proximity to the submitted keyword, prominence of the term (e.g., capitalization), the context in which the term is used, etc. For example, if the keyword "tiger" is submitted as part of a search request, search results analysis engine 124 may analyze the searchable content received from search engine 122 and determine that the terms "zoo" and "Tiger Woods" are used more frequently than others. Search results analysis engine 124 may then include the terms "zoo" and "Tiger Woods" in the list of selectable terms as part of the search results list. Another exemplary technique for identifying useful terms may include using a priori information about a particular search result, such a metadata. Another exemplary technique may include using one or more predetermined lists, such as where the search request is a commonly used query. In this embodiment, usage data may be maintained for commonly used queries to assist in creating and maintaining the predetermined lists. Another exemplary technique may include using linking structures within search results in the search results list to analyze content or metadata referenced by such linking structures.

Search results analysis engine 124 may be further configured to receive a user-selection of one or more terms from the list of selectable terms. The user-selected terms may be used by visitor 102 as, for example, a search results map, index, or table of contents to eliminate less relevant search results from the search results web page and focus on more relevant search results. For example, the terms "zoo" and "Tiger Woods" may be included among other terms in the list of selectable terms, and visitor 102 may desire to eliminate search results in which the retrieved content includes or is otherwise related to the term "Tiger Woods." Visitor 102 may select the term "Tiger Woods" in a manner indicating that search results in which the retrieved content includes or is otherwise related to the term "Tiger Woods" should be eliminated from the search results list. As another example, visitor 102 may desire to keep only search results in which the retrieved content includes or is related to the term "zoo." Visitor 102 may select the term "zoo" in a manner indicating that only search results in which the retrieved content includes or is related to the term "zoo" should be included in the search results list.

According to an exemplary embodiment, the degree of relation of content to a term in the list of selectable terms may be based, for example, on whether the exact term or permutations thereof, (e.g., plural or possessive usage of the term, etc.) appear in the content. According to another exemplary embodiment, predetermined relationships between the selected term and other types of content may be used to determine the degree of relation of content to a term in the list of selectable terms. For example, if the user selects the term "Tiger Woods" in a manner indicating that search results in which the retrieved content includes or is otherwise related to the term "Tiger Woods" should be eliminated from the search results list, search results related to golf in general may be excluded as well as those particularly including the term "Tiger Woods." According to another exemplary embodiment, relationships between particular websites or other sources may be used. For example, if a significant amount of content or number of web pages or other documents at a particular web site or other source would be excluded based on a user selection of the term "Tiger Woods," then content at other websites or sources generally known to be similar to the particular website or source may be excluded as well. According to another exemplary embodiment, past user behavior may be used.

Search results analysis engine 124 may be further configured to provide an updated list of search results upon receipt of the user-selected terms, such that the updated list of search results is a more focused list of search results according to the user-selected terms. For example, visitor 102 may have selected the term "Tiger Woods" in a manner indicating that search results in which the retrieved content includes or is otherwise related to the term "Tiger Woods" should be eliminated from the search results list. In response, search results analysis engine 124 may provide an updated search results list that excludes search results having content including or otherwise related to the term "Tiger Woods." As another example, visitor 102 may have selected the term "zoo" in a manner indicating that only search results in which the retrieved content includes or is otherwise related to the term "zoo" should be included in the search results list. In response, search results analysis engine 124 may provide an updated search results list that includes search results having content including or otherwise related to the term "zoo."

Search results analysis engine 124 may be further configured to perform a modified search upon request to obtain additional search results based on the initial search request and further based on the user-selected terms. For example, visitor 102 may have selected the term "Tiger Woods" in a manner indicating that search results in which the retrieved content includes the term "Tiger Woods" should be eliminated from the search results list. Upon request from visitor 102, search results analysis engine 124 may provide a new search results list including search results associated with the keyword "tiger" (provided as a keyword in the initial search) and excluding the keyword "Tiger Woods" based on search results data from search engine 122. As another example, visitor 102 may have selected the term "zoo" in a manner indicating that only search results in which the retrieved content includes the term "zoo" should be included in the search results list. Upon request from visitor 102, search results analysis engine 124 may provide a new search results list including search results associated with the keywords "tiger" and "zoo" based on search results data from search engine 122.

As with the initial search request, search results analysis engine may be configured to request the searchable content portions of each of the search results included in the new search results list. According to an exemplary embodiment, search results analysis engine 124 may be configured to provide approximately one hundred search results from search engine 122 ranked according to relevance, and also to request the searchable content for each of the 100 results, which may be stored in database 126 for analysis.

Search results analysis engine 124 may also be configured to provide a new list of selectable terms with the new search results list based on an analysis of the searchable content received from search engine 122 for each of the search results. The new list of selectable terms may be used as described above to again eliminate less relevant search results and focus on more relevant search results. As may be appreciated, search results analysis engine 124 may be configured to facilitate repetition of the process of performing searches and providing lists of selectable terms until search results of the desired focus are achieved.

Search engine service 120 may be configured to perform the above-described functionality by providing a graphical user interface. According to an exemplary embodiment, search results analysis engine 124 may access web page data and templates from database 126 in order to provide one or more graphical user interface screens. These graphical user interface screens may be configured to facilitate interaction with visitor (e.g., via a display, keyboard, mouse, or other user input and output devices) 102 to, for example, present search results lists in the form of search results web pages in a displayable format to visitor 102, including a list of search results and user-selectable terms, and to receive user selections of terms from the list of user selectable terms.

Figure 2:
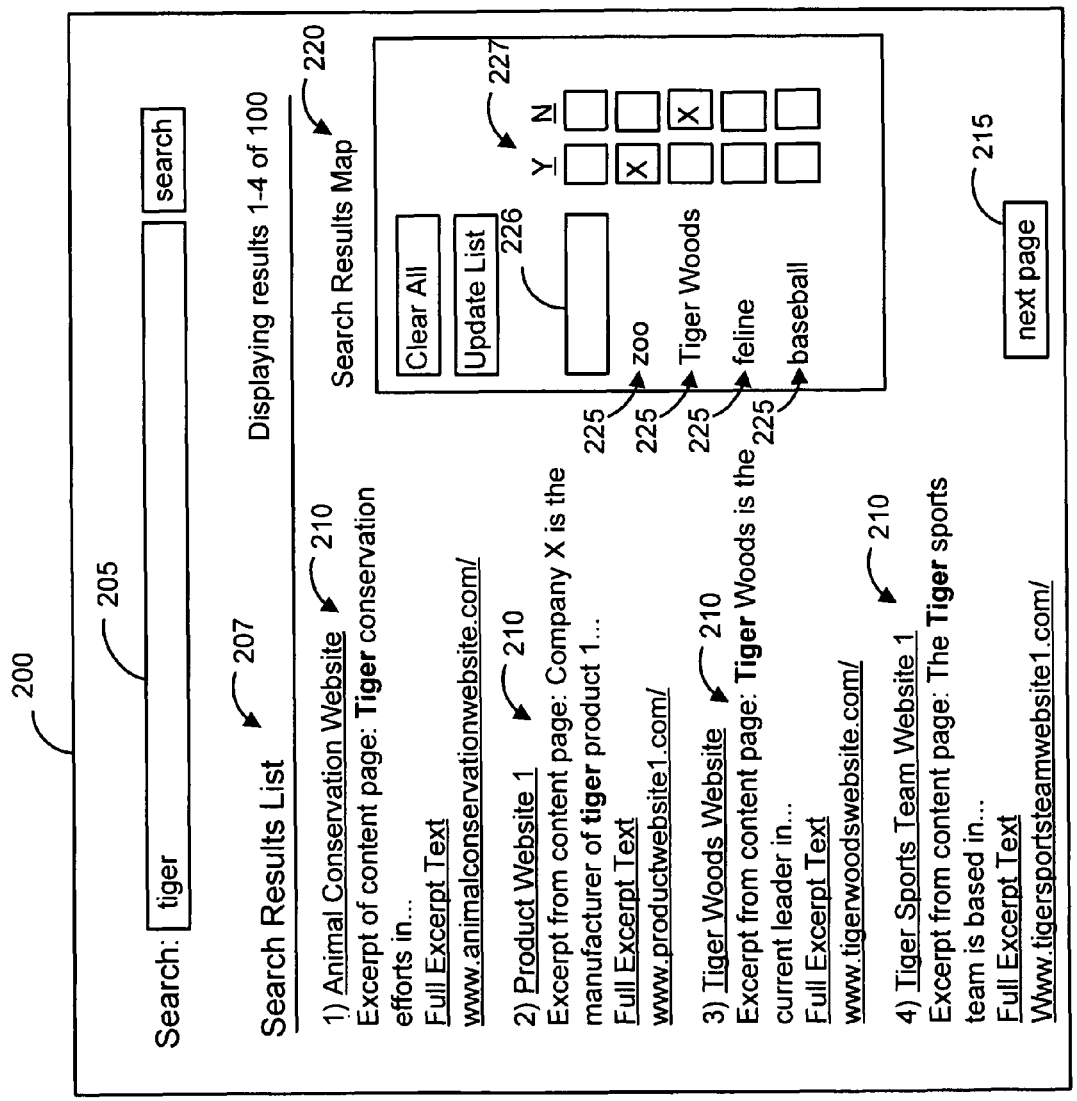
FIG. 2 illustrates a graphical user interface screen for providing search results according to an exemplary embodiment.

FIG. 2 illustrates a graphical user interface screen 200 for providing search results according to an exemplary embodiment. In the illustrated embodiment, search engine 122 has executed an Internet search in response to the keyword "tiger" entered by visitor 102 in field 205. Data from search engine 122 has been provided to search results analysis engine 124 for a list 207 of search results 210 to be displayed in the form of hyperlinks to content-based web sites or web pages or other documents 108 associated with the keyword "tiger." A subset of the first four of the resulting one hundred search results 210 are displayed in screen 200 along with a button 215 to allow the next set of search results 210 to be accessed. As shown in FIG. 2, screen 200 may also display excerpts of content retrieved by search engine 122 for each search result 210, as well as a hyperlink to the full excerpt text and the URL for the website or web page or other document 108. Screen 200 may also emphasize the occurrence of the keyword in the excerpt text. For example, as shown in FIG. 2, the occurrence of the keyword "tiger" is shown in bold in each content excerpt. The rank of each search result 210 in list 207 may also be displayed in screen 200, as shown in FIG. 2.

Screen 200 may also include a list 220 of selectable terms 225, shown in FIG. 2 as a "Search Results Map." As described above, the list of selectable terms may be based on an analysis of searchable content received by search results analysis engine from search engine 122 for each of the search results 210 to identify terms that may be useful in grouping or otherwise determining useful relationships among the search results. FIG. 2 shows four terms 225 identified by search results analysis engine 124 that may be used by visitor 102 as, for example, a search results map, index, or table of contents to eliminate less relevant search results and identify more relevant results. According to an exemplary embodiment, visitor 102 may also manually enter a term 225 in field 226.

According to an exemplary embodiment, one or more selectable objects 227 may be displayed adjacent to each term 225 in list 220 to facilitate selection by visitor 102. For example, FIG. 2 illustrates selectable objects 227 in the form of two "check boxes" adjacent to each term 225 in list 220 to facilitate selection by visitor 102. To eliminate search results 210 in list 207 for which the retrieved content includes a particular term 225, visitor 102 may select (e.g., using a mouse or other user input device) the adjacent selectable object 227 in the "N" column. To specifically include search results 210 in list 207 for which the retrieved content includes a particular term 225, visitor 102 may select the adjacent selectable object 227 in the "Y" column. For example, as shown in FIG. 2, visitor 102 has selected selectable object 227 in the "N" column adjacent to the term "Tiger Woods" to indicate that search results 210 in which the retrieved content includes the term "Tiger Woods" should be eliminated from search results list 207. Visitor 102 has also selected selectable object 227 in the "Y" column adjacent to the term "zoo" to indicate that search results 210 in which the retrieved content includes the term "zoo" should be included in search results list 207.

Figure 3:
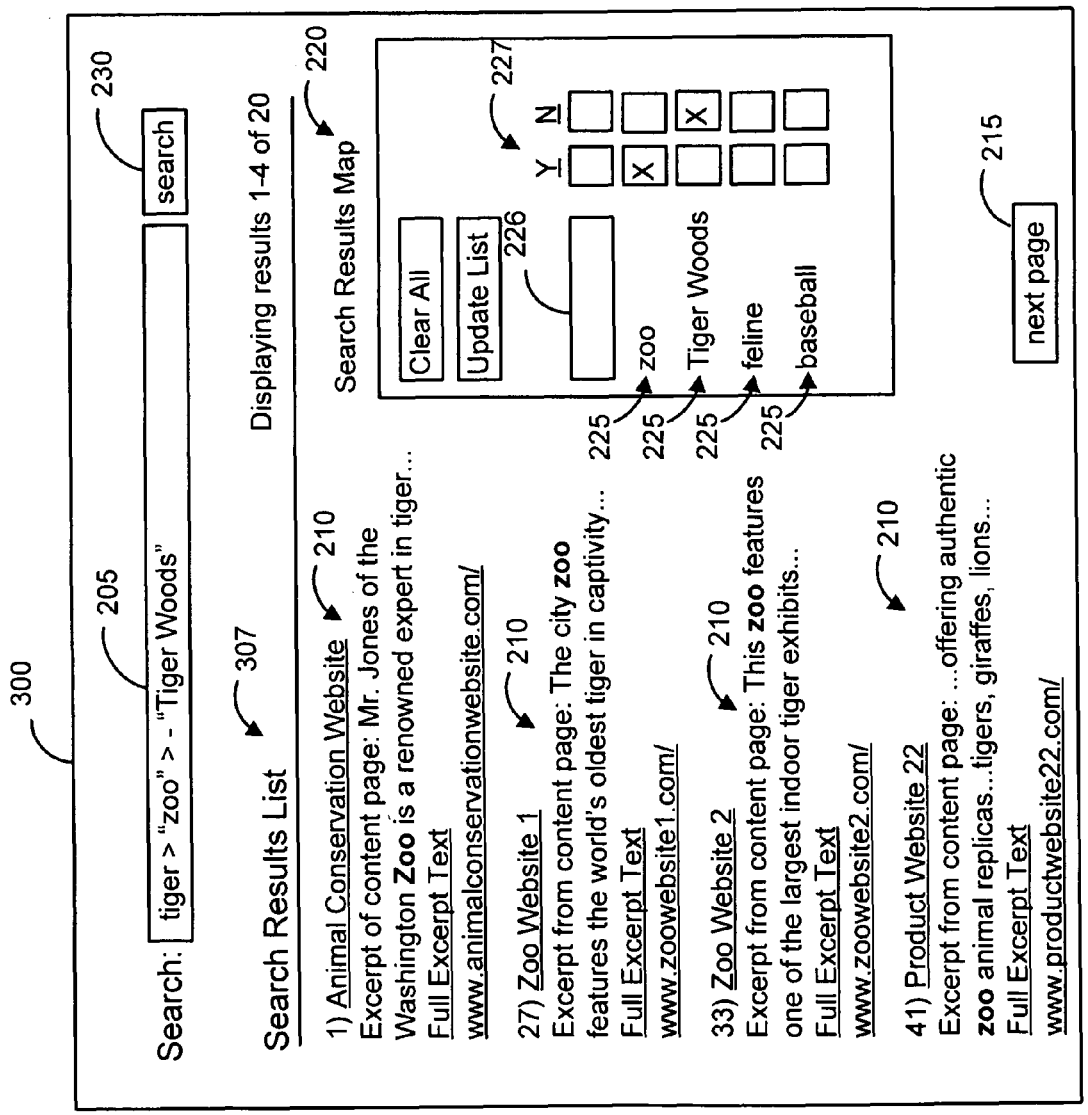
FIG. 3 illustrates the graphical user interface screen of FIG. 2 including an updated list of search results according to an exemplary embodiment.

FIG. 3 illustrates a graphical user interface screen 300 according to an exemplary embodiment. Screen 300 is similar to screen 200, but includes an updated list 307 of search results 210 according to the terms 225 selected from list 220 by visitor 102. As shown in FIG. 3, list 307 excludes the search results 210 from list 207 in which the retrieved content included the term "Tiger Woods," such as the "Tiger Woods Website" originally listed second in order in list 207. List 307 includes, however, the search results 210 from list 207 in which the retrieved content included the term "zoo," such as the "Animal Conservation Website" originally listed first in order in list 207. As shown in FIG. 3, only twenty of the original one hundred search results 210 remain after updating list 307 according to the terms 225 selected from list 220 by visitor 102. The first four of the remaining twenty search results 210 are displayed in screen 200 with their original rankings for reference as shown in FIG. 3. Screen 300 may also display updated excerpts of web page content retrieved by search engine 122 for each search result 210 to indicate terms 225 selected from list 220 by visitor 102. For example, as shown in FIG. 3, the excerpts for each search result 210 have been updated to indicate an occurrence of the term "zoo" (shown in bold in each content excerpt).

According to an exemplary embodiment, one or more of the terms 225 selected from list 220 by visitor 102 may also be automatically added to field 205 to facilitate a modified search request to retrieve additional search results. For example, as shown in FIG. 3, the terms "zoo" and "Tiger Woods" have been automatically added to field 205. The minus sign before the term "Tiger Woods" indicates that search results in which the retrieved content includes or is otherwise related to the term "Tiger Woods" are to be excluded. A modified search request including the terms "tiger" and "zoo" and exclusive of "Tiger Woods" may be executed upon request by visitor 102. Visitor 102 may initiate the modified search by, for example selecting a selectable object 230, shown in FIG. 3 as a "search" button in screen 300.

According to an exemplary embodiment, the ">" symbol may be used to represent a hierarchical search structure. Each time the ">" symbol is used between terms, a lower or subservient hierarchical level is established for the term to the right of the ">" symbol based on terms to the left. For example, the hierarchical search structure tiger>"zoo">-"Tiger Woods" in field 205 may represent a search for the term "tiger," and that within search results containing the term "tiger," search results containing the term "zoo" should be included. Within search results containing the terms "tiger" and "zoo," search results containing the term "Tiger Woods" should be excluded (as indicated by the "-" symbol or another suitable indicator). According to another exemplary embodiment, the hierarchical search structure may be saved and used again, or otherwise entered into field 205 to retrieve search results. In this way, the hierarchical search structure may be saved as part of a user history such that the user may return to the same or a somewhat similar search results list. According to another exemplary embodiment, multiple terms may be grouped together for inclusion or exclusion in a single hierarchical level. In this embodiment, terms in the same hierarchical level may be used to focus the search to include search results containing any one of the terms on that level. For example, the hierarchical search structure tiger >"zoo" "Tiger Woods" in field 205 may represent a search for the term "tiger," and that within search results containing the term "tiger," search results containing either the term "zoo" or the term "Tiger Woods" should be included. According to another exemplary embodiment, terms in the same hierarchical level may be used to focus the search to include only search results containing all of the terms on that level. For example, the hierarchical search structure tiger >"zoo" "Tiger Woods" in field 205 may represent a search for the term "tiger," and that within search results containing the term "tiger," only search results containing both the term "zoo" and the term "Tiger Woods" should be included.

Figure 4:
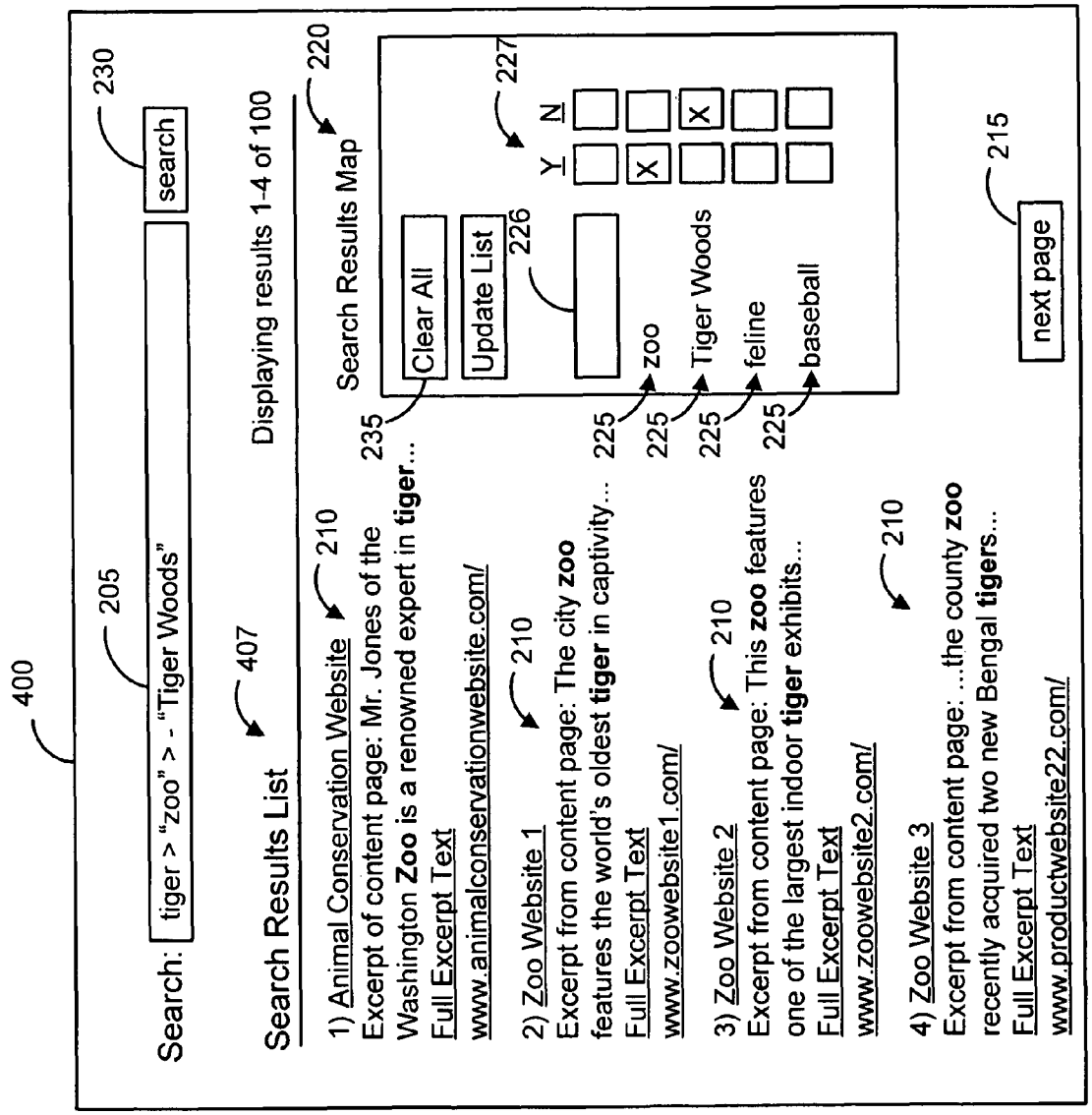
FIG. 4. illustrates the graphical user interface screen of FIG. 3 including a new list of search results based on a modified search according to an exemplary embodiment.

FIG. 4. illustrates a graphical user interface screen 400 according to an exemplary embodiment. Screen 400 is similar to screens 200 and 300, but includes a new list 407 of search results 210 according to a modified search based on the terms 225 selected from list 220 by visitor 102. As shown in FIG. 4, list 407 includes search results 210 for which the retrieved content includes or is otherwise related to the terms "tiger" and "zoo," and excludes content that includes or is otherwise related to the term "Tiger Woods." A subset of the first four of the resulting one hundred search results 210 are displayed in screen 200 along with a button 215 to allow the next set of search results 210 to be accessed. As with screen 200, screen 400 may also display excerpts of content retrieved by search engine 122 for each search result 210, as well as a hyperlink to the full excerpt text and the URL for the website or web page or other document 108. Screen 400 may also emphasize the occurrence of the keywords in the excerpt text. For example, as shown in FIG. 4, the occurrence of the keywords "tiger" and "zoo" are shown in bold in each content excerpt. According to an exemplary embodiment, only occurrences of the last keyword in field 205 for which related content is to be included are emphasized (e.g., only occurrences of the keyword "zoo"). The rank of each search result 210 in list 407 may also be displayed in screen 400, as shown in FIG. 4.

According to an exemplary embodiment, a new list of selectable terms may be obtained for the search results 210 in list 407 based on an analysis of searchable content received from search engine 122 for each of the search results 210. The new list of selectable terms may be used as described above to again eliminate less relevant search results and focus on more relevant search results. The new list of selectable terms may be obtained upon request by visitor 102. Visitor 102 may request the new list of selectable search terms by, for example, selecting a selectable object 235, shown in FIG. 4 as an "update list" button in screen 400.

Figure 5:
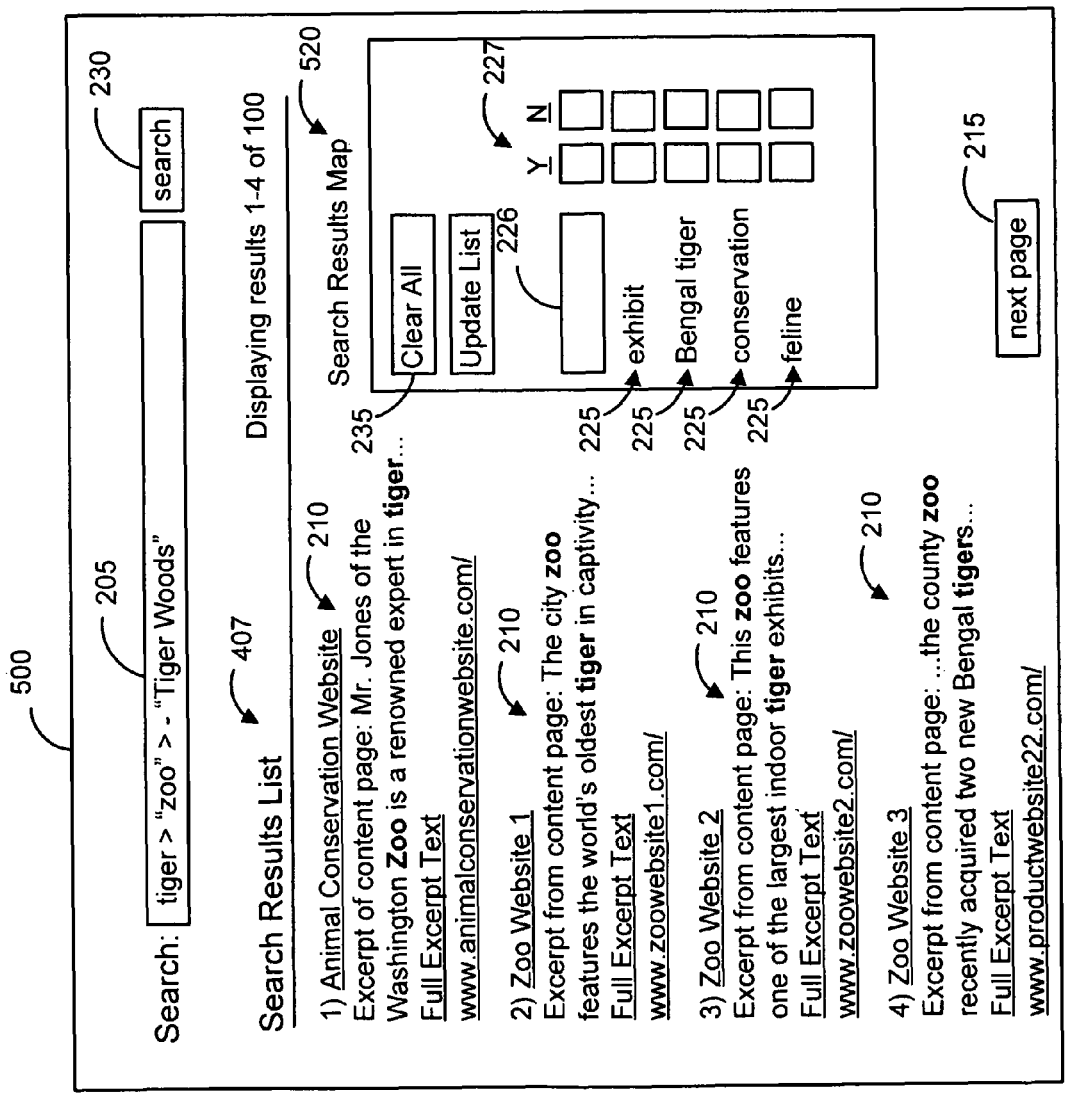
FIG. 5. illustrates a graphical user interface screen of FIG. 4 including a new list of selectable terms based on an analysis of searchable content received for search results from a modified search according to an exemplary embodiment.

FIG. 5. illustrates a graphical user interface screen 500 according to an exemplary embodiment. Screen 500 is similar to screens 200, 300, and 400, but includes a new list 520 of selectable terms 225 based on an analysis of searchable content received from search engine 122 for each of the search results 210 in list 407. As shown in FIG. 5, the new list 520 includes the terms "exhibit," "Bengal tiger," "conservation," and "feline."

The graphical user interface screens and sequence thereof described with respect to FIGS. 2-5 are intended as examples only, and many variations are possible. For example, according to an exemplary embodiment, an updated search and list of selectable terms may automatically be generated upon selection of a single term from the list of selectable terms 220 in screen 200 shown in FIG. 2. In this embodiment, selecting the term "zoo" would automatically take the user to screen 500, wherein a new list of search results and selectable terms are provided. According to another exemplary embodiment, only the list of selectable terms 220 is provided in screen 200. In this embodiment, selecting the term "zoo" would automatically take the user to screen 500, wherein only the list of selectable terms 520 is provided. A succession of subsequent additional screens may be provided upon selection of a term from each list of selectable terms until the user is satisfied with the focus of the search as indicated by the current list of selectable terms. The final search results list may then be displayed to the user. In this way, streamlined navigation may be provided for users of smaller devices, such as personal digital assistants (PDAs), web-enabled phones and e-mail devices, etc. which may have limited screen sizes. The use of the terms in the list of selectable terms may also facilitate use of alternate user input methods, such as voice recognition, touch screens, etc., making such devices more compelling.

Figure 6:
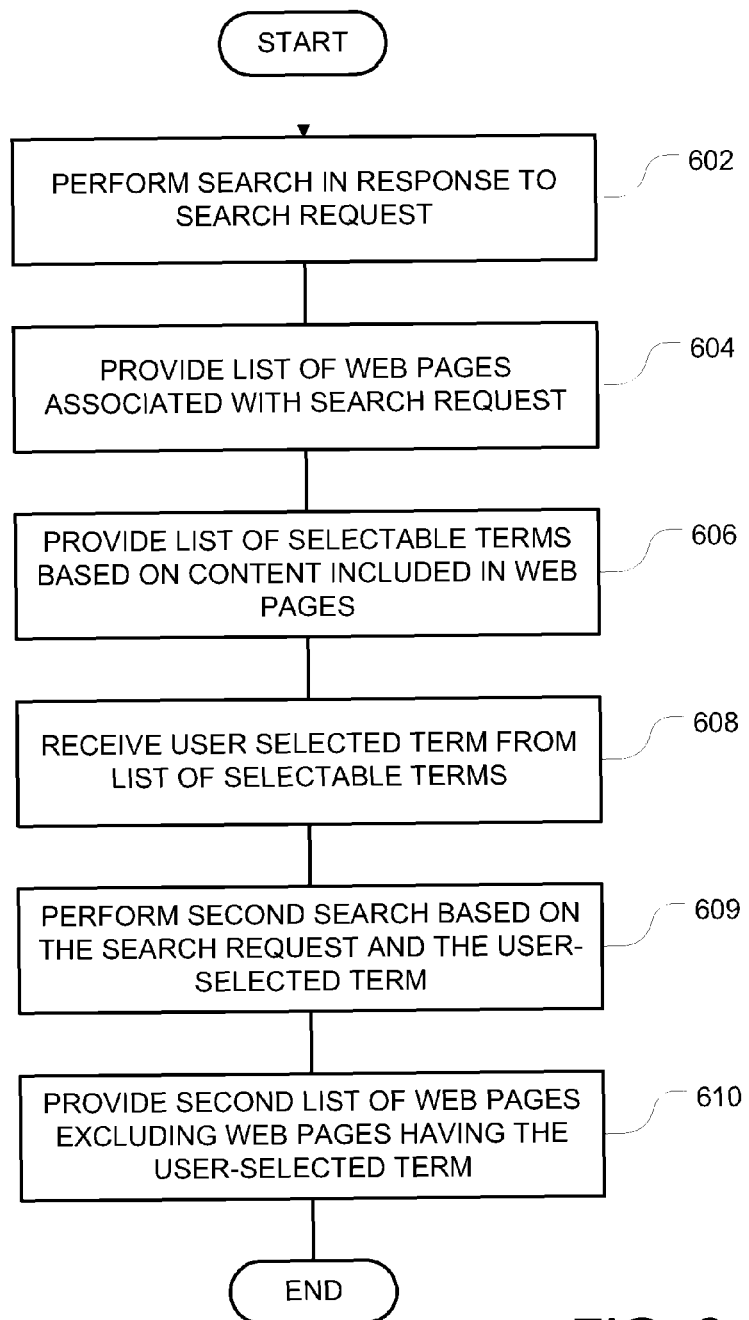
FIG. 6 is a flow diagram illustrating a method of providing focused search results using the system of FIG. 1 according to an exemplary embodiment.

FIG. 6 is a flow diagram illustrating a method 600 of providing focused search results using system 100 according to an exemplary embodiment. Some aspects of the operation described in connection with method 600 have previously been described above. Method 600 begins with a step 602. At step 602, a search may be performed in response to a search request, and at a step 604 a first list of results associated with the search request may be provided. For example, search results analysis engine 124 may receive one or more keywords as part of a search request from a visitor 102, and provide a list of search results associated with the keyword based on search results data from search engine 122 in the form of a search results web page. The list of results may also include excerpts of content retrieved by search engine 122 for each search result.

At a step 606, a list of selectable terms based on content included in the first list of results may be provided. The list of selectable terms may be based on an analysis of the searchable content received from search engine 122 for each of the search results to identify terms that may be useful in grouping or otherwise determining useful relationships among the search results. According to an exemplary embodiment, search results analysis engine 124 is configured to analyze the searchable content received from search engine 122 for each of the search results to identify one or more terms based on such exemplary factors as frequency of use, proximity to the submitted keyword, prominence of the term (e.g., capitalization), the context in which the term is used, etc.

At a step 608, a user-selected term from the list of selectable terms may be received. The user-selected terms may be used to eliminate less relevant search results and focus on more relevant search results. At a step 609, a second search based at least in part on the search request and the user-selected term may be performed. At a step 610, a second list of results may be provided. The second list of results excludes results having content including or otherwise related to the user-selected term.

Here and throughout, terms such as "user," "advertiser," "publisher," "visitor," and so forth are to be understood in the broadest possible sense. Herein, the term "user" is used generically to refer to advertisers, publishers, and visitors. By way of illustration and not of limitation, an "advertiser" may be an individual or a commercial, government, or non-profit entity; may be directly responsible for placing an advertisement, announcement, message, or the like, or may be a broker, reseller, or intermediary for another's advertisements, announcements, messages, or the like; may be advertising for its own products and services or may be advertising on behalf of another; may be represented by a human agent or by a web service, software agent, or other programmatic construct, etc. Likewise, a "publisher" is not restricted to persons or entities who purport to be in the on-line publishing business (or any other kind of publishing business), nor to entities who have complete or even primary control over the content of particular websites; but rather is used in a more general sense. In the context of Internet-based advertising, for example, "publisher" includes any person or entity responsible directly or indirectly for putting content on the Internet, whether by hosting or sponsoring websites, posting pages, frames, graphics, applets, blogs, audiovisual content, etc., on their own or others' websites, providing web services that can source content for websites, or in any other manner. Still further, a "visitor" may be an individual who visits and views or otherwise perceives the content of a web site and pages therein via a web browser or other client software program running on a personal computer, wireless handheld device, or the like, but may also be, for example, a corporate or other entity whose servers access published web content and advertisements by invoking web services through appropriate APIs; a "visitor" may or may not be the intended or actual end consumer of a product or service that is the subject of an advertisement, etc. A "potential customer" may be an individual who views advertising, regardless of the media in which it is published (e.g., print, television, on-line, etc), and may or may not be the intended or actual end consumer of a product or service that is the subject of an advertisement, etc. In sum, persons of skill in the art will appreciate that a wide variety of actors, more than can be conveniently set forth here, can play the roles of "advertiser," "publisher," and "visitor" for purposes of the present invention. It will be further appreciated that the same person or entity may be both "publisher" and "advertiser," or both "publisher" and "visitor," or both "advertiser" and "visitor", or even all three, depending on the context. In a similar vein, and as will be apparent from the foregoing, terms such as "web page," "website," and so forth are used to give specific illustrative examples of settings in which on-line content and advertisements can be presented to and perceived by users. Such examples are not intended to be limiting, and persons of skill in the art will appreciate that many other such settings now known or yet to be developed may be suitable to the practice of the present invention in specific embodiments.

It should be noted that although flow charts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule-based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The exemplary embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations.

The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method of providing search results, comprising:
   under the control of one or more computer systems configured with executable instructions,
   performing a first search in response to a search request;
   generating for display a first list of results responsive to the search request;
   analyzing searchable content of each of the results in the first list of results to identify terms in the searchable content that are useful in grouping sets of the first list of results;
   providing the identified terms in a list of selectable terms to be displayed with the first list of results, the terms being selectable independently of multi-character or single-character textual input;
   receiving a selection of a user-selected term from the list of selectable terms, the list including selectable objects placed on a user interface adjacent to the terms on the list, the user-selected term being selected by selecting a selectable object adjacent to the term, said selecting being done independently of multi-character or single-character textual input, the selection causing results having content related to the user-selected term to be excluded from a second list of results; and
   in response to receiving the selection of the user-selected term, performing a second search based at least upon the search request and the user-selected term and generating for display the second list of results that excludes results having content related to the user-selected term,
   wherein the second list of results is further able to include results not included in the first list of results.

2. The method of claim 1, wherein the list of selectable terms is a first list of selectable terms, the method further comprising:
   providing a second list of selectable terms based at least in part on content included in the second list of results.

3. The method of claim 2, wherein the user-selected term is a first user-selected term, the method further comprising:
   receiving a selection of a second user-selected term from the second list of selectable terms; and
   providing a third list of results and a third list of selectable terms.

4. The method of claim 1, wherein providing the list of selectable terms includes analyzing the content included in the first list of results to determine at least one of frequency, proximity, prominence, and context of terms included in the content.

5. The method of claim 1, wherein providing the list of selectable terms includes analyzing metadata included in the first list of results.

6. The method of claim 1, wherein providing the list of selectable terms includes using linking structures within second list of results to analyze content or metadata referenced by the linking structures.

7. The method of claim 1, wherein the search request comprises a keyword.

8. The method of claim 1, wherein the first and second lists of results comprise web pages.

9. The method of claim 1, wherein the list of selectable terms comprises a graphical user interface screen configured to receive the selection of the user-selected term from the list of selectable terms.

10. A system for providing search results, comprising:
    a processor; and
    memory storing instructions that, when executed by the processor, cause the processor to:
      perform a first search based on a keyword;
      generate for display a first list of results associated with the keyword based on the search;
      analyze searchable content of each of the results in the first list of results to identify terms in the searchable content that are useful in grouping sets of the first list of results;
      provide the identified terms in a list of selectable terms to be displayed with the first list of results, the terms being selectable independently of multi-character or single-character textual input;
      receive a selection of a user-selected term from the list of selectable terms, the list including selectable objects placed on a user interface adjacent to the terms on the list, the user-selected term being selected by selecting a selectable object adjacent to the term, said selecting being done independently of multi-character or single-character textual input, the selection causing results having content related to the user-selected term to be excluded from a second list of results; and
      in response to receiving the selection of the user-selected term, perform a second search based at least upon the keyword and the user-selected term and generate for display the second list of results that excludes results having content related to the user-selected term,
      wherein the second list of results is further able to include results not included in the first list of results.

11. The system of claim 10, wherein:
    the list of selectable terms is a first list of selectable terms, and wherein the memory further stores instructions that, when executed by the processor, cause the processor to provide a second list of selectable terms based at least in part on content included in the second list of results.

12. The system of claim 10, wherein the user-selected term is a first user-selected term, and wherein the memory further stores instructions that, when executed by the processor, cause the processor to receive a selection of a second user-selected term from the list of selectable terms.

13. The system of claim 10, wherein the memory further stores instructions that, when executed by the processor, cause the processor to provide the list of selectable terms by analyzing the content included in the first list of results to determine at least one of frequency, proximity, prominence, and context of terms included in the content.

14. The system of claim 10, wherein the first and second lists of results comprise web pages.

15. The system of claim 10, wherein the list of selectable terms comprises a graphical user interface screen configured to receive the selection of the user-selected term from the list of selectable terms.

16. A graphical user interface, comprising:
memory including program logic executable by a processor to:
generate a first display screen, the first display screen including a first list of results, associated with a keyword based on a keyword search, and a list of selectable terms determined by analyzing searchable content of each of the results in the first list of results to identify terms in the searchable content that are useful in grouping sets of the first list of results, wherein the first display screen is configured to receive a selection of a user-selected term from the list of selectable terms; and
generate a second display screen including a second list of results in response to receiving the selection of the user-selected term from the list of selectable terms, the list including selectable objects placed on a user interface adjacent to the terms on the list, the user-selected term being selected by selecting a selectable object adjacent to the term, said selecting being done independently of multi-character or single-character textual input, the selection causing results having content related to the user-selected term to be excluded from the second list of results, wherein the second list of results is generated by performing an updated search based at least upon the keyword search and the user-selected term, the second list of results excluding results having content related to the user-selected term and able to include results not included in the first list of results.

17. The graphical user interface of claim 16, wherein the first display screen further includes an excerpt of text including the keyword from each of the results in the first list of results.

18. The graphical user interface of claim 17, wherein:
the list of selectable terms is a first list of selectable terms; and
the second display screen further includes a second list of selectable terms based at least in part on content included in the second list of results.

19. The graphical user interface of claim 18, wherein:
the user-selected term is a first user-selected term; and
the second display screen is further configured to receive a selection of a second user-selected term from the second list of selectable terms as a third keyword to be used to perform a third search based at least in part on the first, second, and third keywords.

20. The graphical user interface of claim 18, wherein the second display screen further includes an updated excerpt of text including the second keyword from each of the results in the second list of results.

21. A computer-implemented method of providing search results, comprising:
under control of one or more computer systems configured with executable instructions,
receiving a keyword as part of a search request from a user computer;
performing a first search based on the keyword using a search engine;
determining a first list of results corresponding to the first search and including the keyword;
analyzing content of each of the results in the first list of results to identify terms in the content that are useful in grouping sets of the first list of results;
providing the identified terms as a list of selectable terms to be displayed with the first list of results, the terms being selectable independently of multi-character or single-character textual input;
receiving a selection of a user-selected term from the list of selectable terms, the list including selectable objects placed on a user interface adjacent to the terms on the list, the user-selected term being selected by selecting a selectable object adjacent to the term, said selecting being done independently of multi-character or single-character textual input, the selection causing results having content related to the user-selected term to be excluded from a second list of results;
performing a second search based at least upon the keyword and the user-selected term; and
providing the second list of results, the second list of results excluding content related to the user-selected term,
wherein the second list of results is further able to include results not included in the first list of results.

22. The method of claim 21, wherein the list of selectable terms is a first list of selectable terms, the method further comprising:
providing a second list of selectable terms based on content retrieved for the second list of results.

23. The method of claim 21, wherein providing the list of selectable terms includes analyzing the content included in the first list of results to determine at least one of frequency, proximity, prominence, and context of the terms included in the content.

24. The method of claim 21, wherein the first and second lists of results comprise web pages.

25. The method of claim 21, wherein the list of selectable terms comprises a graphical user interface screen configured to receive the selection of the user-selected term from the list of selectable terms.

26. A graphical user interface, comprising:
memory including program logic executable by a processor to generate a search results screen, the search results screen including:
a first list of search results associated with a keyword based on a keyword search, wherein the search results in the list of search results are ranked based on relevance to the keyword; and
a search results index configured to facilitate listing the search results by providing a first list of terms determined by analyzing searchable content of each of the results in the first list of search results to identify terms in the searchable content that are useful in grouping sets of the first list of search results, each term in the first list of terms being selectable independently of multi-character or single-character textual input, wherein the search results screen is configured to:
receive a selection of a user-selected term from the first list of terms provided by the search results index, the first list including selectable objects placed on a user interface adjacent to the terms on the first list, the term being selected by selecting a selectable object adjacent to the term, said selecting being done independently of multi-character or single-character textual input, the selection causing search results having content related to the user-selected term to be excluded from a second list of results, and cause an updated search to be performed based at least upon the keyword search and the user-selected term to generate the second list of results, the second list of results excluding search results that are in a grouped set for the user-selected term and that is able to include results not included in the first list of results, wherein the second list of results is configured to be presented to the user through the search results screen in response to receiving the user-selected term.

27. The graphical user interface of claim 26, wherein the search results screen is a first search results screen, and the program logic is further configured to:

generate a second search results screen in response to receiving the selection of the user-selected term from the search results index, the second search results screen including the second list of search results.

28. The graphical user interface of claim 27, wherein the search results index is a first search results index, and the program logic is further configured to:

generate a second search results index configured to facilitate listing the search results in the second list of search results based at least in part on terms included in content associated with each of the search results in the second list of search results, wherein the second search results screen is configured to receive a user-selected term from the second search results index.

\* \* \* \* \*